United States Patent
Oh

(10) Patent No.: US 10,018,141 B2
(45) Date of Patent: Jul. 10, 2018

(54) CONTROL METHOD AND SYSTEM FOR FUEL INJECTOR

(71) Applicants: Hyundai Motor Company, Seoul (KR); KIA Motors Corporation, Seoul (KR)

(72) Inventor: Young Kyu Oh, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/259,824

(22) Filed: Sep. 8, 2016

(65) Prior Publication Data

US 2017/0167429 A1 Jun. 15, 2017

(30) Foreign Application Priority Data

Dec. 11, 2015 (KR) .................. 10-2015-0177237

(51) Int. Cl.
*F02D 41/30* (2006.01)
*F02D 41/36* (2006.01)
(Continued)

(52) U.S. Cl.
CPC ....... *F02D 41/365* (2013.01); *F02D 41/3094* (2013.01); *F02D 41/345* (2013.01);
(Continued)

(58) Field of Classification Search
CPC .... F02D 41/30; F02D 41/3094; F02D 41/365; F02D 41/435; F02D 41/047; F02D 2041/0015; F02M 69/044
See application file for complete search history.

(56) References Cited

U.S. PATENT DOCUMENTS 2,228,302 A * 1/1941 Falcon ................... F02B 33/22
123/263
4,548,175 A 10/1985 Kawai et al.
(Continued)

FOREIGN PATENT DOCUMENTS

JP 2003-262175 A 9/2003
JP 2010-281333 A 12/2010
(Continued)

OTHER PUBLICATIONS

Korean Office Action dated Dec. 23, 2016, issued in Korean patent application No. 10-2015-0177237.
(Continued)

*Primary Examiner* — Hieu T Vo
(74) *Attorney, Agent, or Firm* — McDermott Will & Emery LLP

(57) ABSTRACT

A control method for a vehicle injector includes an injection time determination step in which a controller determines whether it is necessary for multiple injectors to inject fuel according to a combustion cycle of a combustion chamber, an individual injection step in which the controller controls each of the multiple injectors to individually inject fuel at different times when the controller determines in the injection time determination step that it is necessary for the injectors to inject fuel, and a simultaneous injection step in which the controller controls each of the multiple injectors to simultaneously inject fuel after the multiple injectors individually inject fuel at different times in the individual injection step.

5 Claims, 4 Drawing Sheets

(51) Int. Cl.
*F02D 41/34* (2006.01)
*F02D 41/04* (2006.01)
*F02M 69/04* (2006.01)
*F02D 41/00* (2006.01)

(52) U.S. Cl.
CPC .... *F02D 41/047* (2013.01); *F02D 2041/0015* (2013.01); *F02M 69/044* (2013.01); *Y02T 10/44* (2013.01)

(56) References Cited

U.S. PATENT DOCUMENTS

| | | | |
|---|---|---|---|
| 6,848,414 B2* | 2/2005 | West | F02D 41/3836 |
| | | | 123/299 |
| 8,078,387 B2* | 12/2011 | Kumano | F02D 13/0265 |
| | | | 123/299 |
| 2013/0066537 A1 | 3/2013 | Saruwatari | |
| 2014/0156174 A1 | 6/2014 | Lee et al. | |

FOREIGN PATENT DOCUMENTS

| | | | | | |
|---|---|---|---|---|---|
| JP | 2013-060893 A | | 4/2013 | | |
| JP | 2013-160107 A | | 8/2013 | | |
| JP | 2016173058 A | * | 9/2016 | ........... | F02D 41/405 |
| KR | 10-1997-0001923 A | | 1/1997 | | |
| KR | 10-1998-0078705 A | | 11/1998 | | |
| KR | 10-2003-0046697 A | | 6/2003 | | |
| WO | 2011/154232 A1 | | 12/2011 | | |

OTHER PUBLICATIONS

Extended European Search Report issued in corresponding European Patent Application No. 16187376.5, dated Oct. 26, 2017.

* cited by examiner

CONTROL METHOD AND SYSTEM FOR FUEL INJECTOR

CROSS REFERENCE TO RELATED APPLICATION

The present application claims the benefit of priority to Korean Patent Application No. 10-2015-0177237, filed on Dec. 11, 2015 with the Korean Intellectual Property Office, the entire content of which is incorporated herein for all purposes by this reference.

TECHNICAL FIELD

The present disclosure relates to a control method and system for a fuel injector that supplies fuel to a vehicle engine. More particularly, the present disclosure relates to a control method and system for a fuel injector, which may effectively improve combustion efficiency and reduce harmful exhaust gasses, through an injection plan using multiple injectors.

BACKGROUND

Various techniques pertaining to a fuel injection method, an intake control method and a structure of an intake port have been developed and have been applied to a vehicle in order to improve engine efficiency.

Among the various techniques, as a method for improving efficiency of a vehicle engine, a method in which fuel ingredients have a constant concentration in a mixer by improving the performance of mixing air and fuel that flow into a combustion chamber has been developed, and the combustion efficiency of an engine may be increased by quickening an ignition time.

Particularly, in order to improve the performance of mixing air and fuel, an injection variable such as the injection time or pattern of an injector may be controlled to induce swirling, whereby ignition is stimulated and combustion efficiency may be improved.

Here, swirling indicates that intake air flowing in a combustion chamber forms eddies that rotate along a circumference of a combustion chamber. Due to the swirling intake air, the performance of mixing the intake air and fuel in the combustion chamber is improved and combustion efficiency may be improved.

Also, when fuel is injected by the injection nozzle of an injector arranged in an intake port side, if the fuel injected by the injector adheres to the flow path of the intake port, this may adversely affect the fuel efficiency of an engine. Therefore, the prevention of the adhesion of fuel is important in improving the efficiency of an engine.

The foregoing is intended merely to aid in the understanding of the background of the present disclosure, and is not intended to mean that the present disclosure falls within the purview of the related art that is already known to those skilled in the art.

SUMMARY

The present disclosure relates to a control method and system for a vehicle injector, and an object of the present disclosure is to effectively improve combustion efficiency and to reduce harmful substances of exhaust gas through an injection plan using multiple injectors.

In order to achieve the above object, a control method for a vehicle injector according to the present disclosure may include: an injection time determination step in which a controller determines whether it is necessary for multiple injectors to inject fuel according to a combustion cycle of a combustion chamber; an individual injection step in which the controller controls each of the multiple injectors to individually inject fuel at different times when the controller determines in the injection time determination step that it is necessary for the injectors to inject fuel; and a simultaneous injection step in which the controller controls each of the injectors to simultaneously inject fuel after the injectors individually inject fuel at different times in the individual injection step.

In the individual injection step, the controller may control each of the injectors to make the injectors alternately inject fuel multiple times.

In the individual injection step, the controller may control a fuel injection section of each of the injectors to form a delay section, during which fuel injection is not performed, in an interval between the fuel injection sections of the injectors.

In the simultaneous injection step, the controller may regulate a total fuel amount injected in one combustion cycle by regulating an amount of fuel injected by each of the injectors.

In the individual injection step, the multiple injectors may be arranged on an intake port of an engine, and the controller may make the multiple injectors perform a first fuel injection in a state in which an intake valve arranged in the combustion chamber is closed.

Meanwhile, in order to achieve the above object, a control system for a vehicle injector according to the present disclosure may include: injectors arranged to inject fuel toward a combustion chamber of an engine; and a controller for determining whether it is necessary for the injectors to inject fuel according to a combustion cycle of a combustion chamber, for controlling each of the injectors to make the injectors individually inject fuel at different times when determining that it is necessary for the injectors to inject fuel, and for controlling each of the injectors to make the injectors simultaneously inject fuel after the injectors individually inject fuel at different times.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Hereinbelow, exemplary embodiments of the present disclosure will be described in detail with reference to the accompanying drawings.

Figure 1:
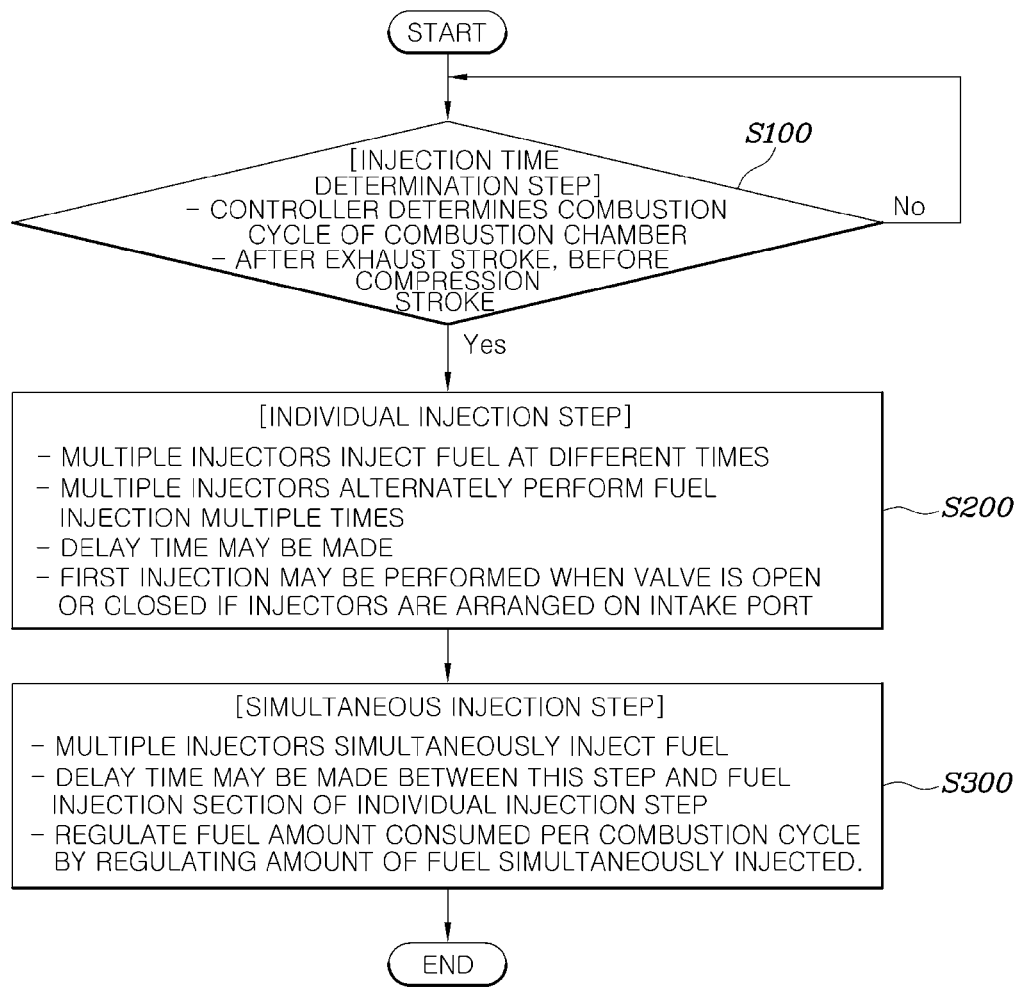
FIG. 1 is a flowchart of a control method for a fuel injector according to an embodiment of the present disclosure.
Figure 2:
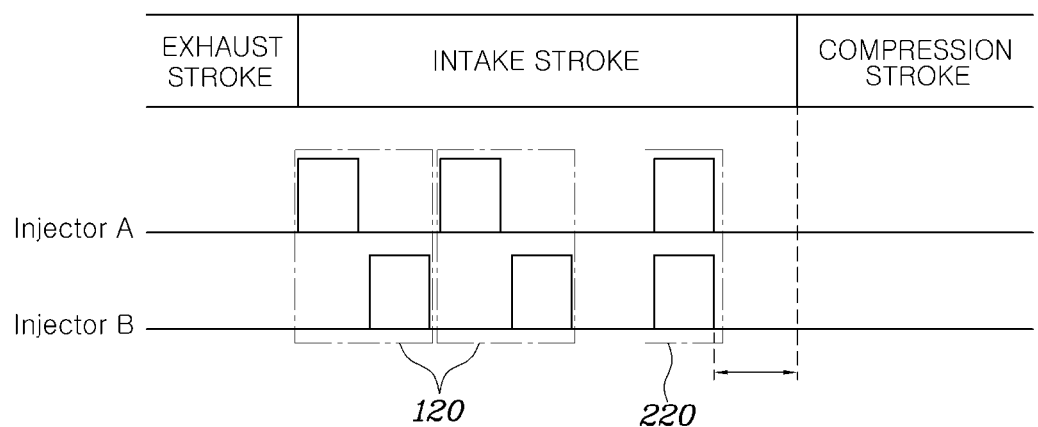
FIG. 2 is a view illustrating a section in which each injector injects fuel by a control method for a fuel injector according to an embodiment of the present disclosure.
Figure 4:
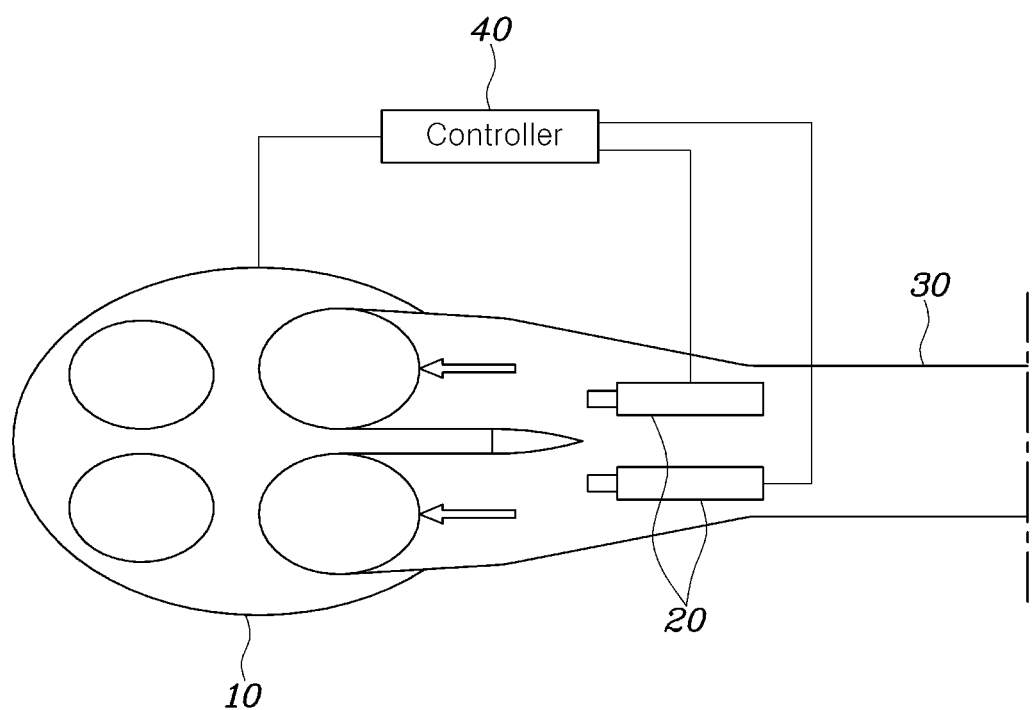
FIG. 4 is a view illustrating a control system for a fuel injector according to an embodiment of the present disclosure.

As illustrated in FIGS. 1, 2 and 4, a control method for a fuel injector according to embodiments of the present disclosure may include: an injection time determination step (S100) in which a controller 40 may determine if it is necessary for multiple injectors 20 to inject fuel according to a combustion cycle in a combustion chamber 10; an individual injection step (S200) in which the controller 40 may control each of the injectors 20 to make the injectors individually inject fuel at different times when determining in the injection time determination step (S100) that the fuel injection by the injectors 20 is required; and a simultaneous injection step (S300) in which the controller 40 may control the injectors to make the injectors simultaneously inject fuel after the injectors 20 inject fuel at different times in the individual injection step (S200).

Specifically, in the injection time determination step (S100), the controller 40 may determine if it is necessary for the multiple injectors 20 to inject fuel according to the combustion cycle of the combustion chamber 10.

In the present disclosure, the controller 40 may be an ECU for controlling an engine, but an additional controller 40 for the injectors 20 may be arranged separately. In this case, the controller 40 may determine the fuel injection time by observing an engine operation condition, specifically, the combustion cycle of the combustion chamber 10 in which the injectors 20 are located. The exact time for fuel injection may be controlled depending on a driving condition of a vehicle.

Meanwhile, when the controller 40 determines in the injection time determination step (S100) that it is necessary for the injectors 20 to inject fuel, the controller 40 may control each of the injectors 20 to make the multiple injectors individually inject fuel at different times in the individual injection step (S200).

Accordingly, the fuel injection sections during which the respective injectors inject the fuel may not overlap each other.

In a state in which multiple injectors 20 are arranged in a single combustion chamber 10, if the controller 40 makes the multiple injectors 20 inject fuel at different times rather than making them simultaneously inject fuel, the flow of the fuel injected by each of the injectors 20 may not have symmetry. Accordingly, a flow deviating from the center of the combustion chamber 10, which may be a flow that rotates along the side of the combustion chamber 10, may be made.

Such a fuel flow may occur more easily when the multiple injectors 20 are arranged on an intake port 30 and each of the injectors 20 injects fuel towards the side of the combustion chamber 10 rather than towards the center point of the combustion chamber 10.

FIG. 4 illustrates an example in which two intake valves may be located in a single combustion chamber 10, injectors 20 may be arranged on an intake port 30 of each of the intake valves, and each of the injectors 20 may be arranged to inject fuel towards the point deviated from the center of the combustion chamber 10.

In other words, when only one injector 20 injects fuel, the fuel flows along the side of the combustion chamber 10 and swirling may be easily induced because the fuel flow may not be disturbed by the flow of fuel injected by another injector 20.

Here, swirling indicates that intake air flowing into the combustion chamber 10 may form eddies that rotate along the circumference of the combustion chamber 10. Due to the swirling intake air, the performance in, or of, mixing the intake air and fuel in the combustion chamber 10 is improved, thus increasing combustion efficiency.

Consequently, as the multiple injectors 20 may inject fuel at different times, the flow of fuel injected by each of the injectors 20 may rotate along the wall of the combustion chamber 10 and swirl. As the swirling occurs, the performance in, or of, mixing air and fuel is improved and fuel efficiency is improved.

Also, an ignition time may be regulated. For example, an ignition time may be quickened by adjusting the injection pattern or injection time of each of the injectors 20. Accordingly, the combustion section, in which combustion is performed in the combustion chamber 10, may be timely controlled in order to satisfy the power performance required for each driving section. In FIG. 2, the individual injection 120 may be depicted as a section in which the controller 40 makes a pair of injectors 20 inject fuel at different times.

Meanwhile, after the multiple injectors 20 inject fuel at different times in the individual injection step (S200), the controller 40 may control each of the injectors 20 to make the multiple injectors inject fuel together in the simultaneous injection step (S300).

In the simultaneous injection step of the present disclosure, as the injectors may inject the fuel together, the fuel injection sections during which the respective injectors inject the fuel may overlap with each other. The injectors may simultaneously inject the fuel. However, even if the injectors inject the fuel at exactly the same time, when the fuel injection sections overlap each other by a degree of 70% or greater, such overlapping timing may have the effect of simultaneous fuel injection described by the present disclosure.

During the individual injection 120 in which each of the injectors 20 may inject fuel for a relatively short time, it may be difficult to regulate the amount of fuel to be injected. In particular, in consideration of a fuel pressure and design of the injectors 20, it may be difficult to satisfy more than a certain level of a fuel amount only through the individual injection 120.

Also, in the individual injection 120 in which initial fuel injection may be performed when the intake valve of the combustion chamber 10 is open, if the fuel amount increases, the fuel may unnecessarily adhere to the intake valve or the wall of the intake port 30, thus reducing the fuel efficiency and/or increasing exhaust gasses.

Therefore, the controller 40 may make the injector 20 inject fuel through multiple phases to reduce the amount of fuel injected at a single phase, whereby the fuel may be prevented from adhering to the intake port 30. Also, because the simultaneous injection step (S300) may be performed after the individual injection phase (S200), the fuel amount required for each driving section may be satisfied.

Furthermore, after swirling is induced in the individual injection step, the swirl of the fuel flow in the combustion chamber may be disrupted in the simultaneous injection step, and this may be advantageous in improving the performance in mixing the intake air and fuel. FIG. 2 shows a simultaneous injection 220 after the individual injection 120 of the injectors 20.

Meanwhile, as illustrated in FIG. 2, in a control method for a fuel injector according to an embodiment of the present disclosure, the controller 40 may make the injectors 20 alternately perform multiple times of fuel injection in the individual injection step (S200).

As described above, the controller 40 may control each of the injectors 20 to make the injectors 20 individually inject fuel at different times. Specifically, the controller 40 may make the injectors 20 alternately perform fuel injection multiple times so as to induce a swirling effect.

When the multiple injectors 20 alternately induce swirling in the combustion chamber 10, the fuel flows may be mutually disturbed by each other. Accordingly, the performance in mixing air and fuel in the combustion chamber 10 may be improved compared to the case in which swirling is induced by the fuel injected by an injector 20 arranged in one side. FIG. 2 shows an example in which a fuel injection section is set in such a way that a pair of injectors 20 alternately inject fuel.

Figure 3:
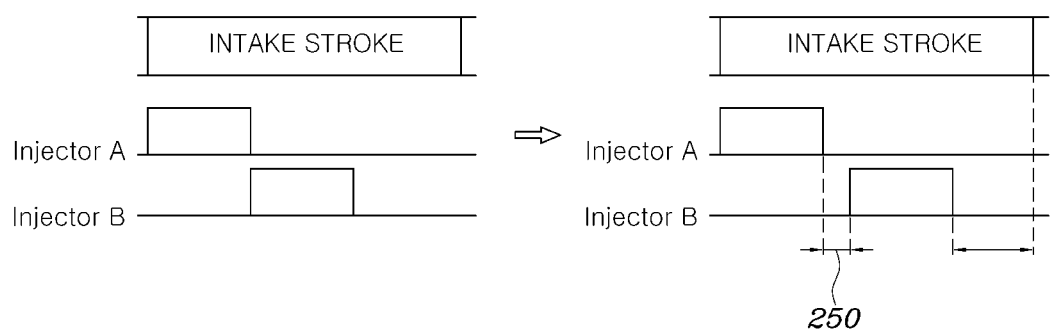
FIG. 3 is a view illustrating a delay time made in an interval between sections in which injectors individually inject fuel in a control method for a fuel injector according to an embodiment of the present disclosure.

Meanwhile, as illustrated in FIGS. 2 and 3, in a control method for a fuel injector according to an embodiment of the present disclosure, the controller 40 may control the fuel injection sections of the injectors 20 to form a delay section 250, during which fuel injection may not be performed, in the interval between the fuel injection sections of the injectors 20 in the individual injection step (S200).

Specifically, the flow of the fuel injected by each of the injectors 20 may induce swirling in the combustion chamber 10 in the individual injection step (S200). However, if an injector 20 in, or disposed in, one side and an additional injector in, or disposed in, another side consecutively inject fuel, the flow of fuel injected by the injector in the one side may be disturbed by the flow of the fuel injected by the additional injector 20 in the other side, before swirling is induced in the combustion chamber 10.

Therefore, in order to ensure a sufficient time to induce swirling in the flow of fuel injected by an injector arranged in one side and to sufficiently mix the fuel and air, a delay section 250 may be formed in the interval between the fuel injection sections of the injectors 20. FIG. 3 shows an example in which a delay section 250 may be set in the interval between the fuel injection sections of the injectors 20.

Consequently, the controller 40 may control the injectors 20 to make a delay section 250 in the interval between the fuel injection sections of the injectors 20, whereby a sufficient time may be secured to enable the flow of fuel injected by each of the injectors 20 to swirl, thus improving the performance in, or of, mixing the fuel and air.

Meanwhile, in a control method for a fuel injector according to an embodiment of the present disclosure, the controller 40 may regulate the total amount of fuel in one combustion cycle by regulating an amount of fuel simultaneously injected by each of the injectors 20 in the simultaneous injection step (S300).

As described above, in the present disclosure, the amount of fuel injected by the injectors 20 may be regulated in the simultaneous injection step (S300), whereby fuel may be prevented from adhering to the wall of the intake port 30 in the individual injection step (S200) and the fuel amount required for each driving section may be satisfied in order to prevent the combustion efficiency of an engine from decreasing.

Meanwhile, in a control method for a fuel injector according to an embodiment of the present disclosure, the multiple injectors 20 may be arranged on the intake port 30 of the engine, and the controller 40 may control the multiple injectors 20 to perform first fuel injection in a state in which the intake valve arranged in the combustion chamber 10 is closed, in the individual injection step (S200).

In the engine, when the intake valve in the combustion chamber 10 opens, intake air may flow into the combustion chamber 10. Then, in a state in which the intake valve is closed, the intake air may be compressed and exploded, and an exhaust stroke may be performed. When multiple injectors 20 are arranged on the intake port 30 of the engine, the fuel injected by the injectors 20 may flow into the combustion chamber 10 only if the intake valve is open.

Accordingly, if the injectors 20 arranged on the intake port 30 inject fuel in a state in which the intake valve is open, the fuel may flow into the combustion chamber 10 and mix with air in the combustion chamber 10. Conversely, if the injectors 20 perform the first fuel injection shortly before the intake valve opens, namely in a state in which the intake valve is closed, the fuel that has been mixed with air in the intake port 30 may flow into the combustion chamber 10 when the intake valve opens.

In other words, in an embodiment of the present disclosure, according to fuel injection through the multiple phases, the first fuel injection may be performed in a state in which the intake valve is closed, whereby a time for mixing the fuel and air may be secured before the intake stroke, and the performance in mixing the fuel and air is improved.

Meanwhile, as illustrated in FIG. 4, a control system for a vehicle injector according to an embodiment of the present disclosure may include: injectors 20 arranged to inject fuel into the combustion chamber 10 of an engine; and a controller 40 arranged to determine whether it is necessary for the injectors 20 to inject fuel according to the combustion cycle of the combustion chamber 10, to control each of the injectors 20 to make the injectors 20 inject fuel at different times when determining that fuel injection is necessary, and to control each of the injectors 20 to make the injectors 20 simultaneously inject fuel after the injectors 20 inject fuel at different times.

Specifically, each of the injectors 20 may have an injection nozzle that faces the combustion chamber 10 so as to inject fuel into the combustion chamber 10. Each of the injectors 20 may have an injection nozzle arranged in the combustion chamber 10, and the injection nozzle may be arranged on the intake port 30 so as to inject fuel towards the intake valve.

Meanwhile, the controller 40 may determine whether it is necessary for the injectors 20 to inject fuel according to a combustion cycle of the combustion chamber 10, may control each of the injectors 20 to make the injectors 20 individually inject fuel at different times when determining that the fuel injection is required, and may control each of the injectors 20 to make the injectors 20 simultaneously inject fuel after the injectors 20 inject fuel at different times.

As described above, the controller 40 may be an ECU corresponding to an engine controller 40 or a controller 40 separately arranged for controlling the injectors 20. The controller 40 may determine whether it is necessary for the injectors 20 to inject fuel by observing an operation condition of the combustion chamber 10. Also, when the fuel injection is required, the controller 40 may control the multiple injectors 20 to inject fuel at different times so that the injected fuel swirls in order to improve the performance in, or of, mixing the fuel and air.

Meanwhile, after the multiple injectors 20 inject fuel at different times, the controller 40 may make the multiple injectors 20 simultaneously inject fuel, whereby the excessive amount of fuel may be prevented from being injected when the injectors 20 individually inject fuel, and thus the fuel may be prevented from adhering to the intake port 30. Also, because the fuel amount required for one combustion cycle can be regulated by the simultaneous fuel injection, the fuel amount required for each driving section may be satisfied.

According to the above-described control method and system for a vehicle injector, through an injection plan using multiple injectors, combustion efficiency may be improved, and exhaust gases may be reduced.

Particularly, because swirling is induced in a combustion chamber through an individual injection plan in which multiple injectors inject fuel at different times, performance in mixing the fuel and intake air may be improved and ignition may be stimulated, thus improving a combustion condition and maximizing fuel efficiency.

Also, even if the amount of fuel injected by the individual injection plan is constant, the fuel amount required by each combustion cycle depending on the driving condition may be regulated through a simultaneous injection plan in which multiple injectors simultaneously inject fuel after the individual injection plan. Therefore, fuel efficiency may be improved and adhesion of fuel to various surfaces may be prevented.

Meanwhile, as a delay time during which fuel injection is interrupted may be formed in an interval between injection sections of injectors, swirling may be stably induced in a combustion chamber through the individual injection plan, thus maximizing performance in mixing fuel and air.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A control system for a vehicle injector, comprising:
    injectors arranged to inject fuel toward a combustion chamber of an engine; and
    a controller for determining whether it is necessary for the injectors to inject fuel according to a combustion cycle of the combustion chamber, for controlling each of the injectors to make the injectors individually inject fuel at different times when determining that it is necessary for the injectors to inject fuel, and for controlling each of the injectors to make the injectors simultaneously inject fuel after the injectors individually inject fuel at different times.

2. The control system of claim 1, wherein when controlling each of the injectors to make the injectors individually inject fuel at different times, the controller controls each of the injectors to alternately inject fuel multiple times.

3. The control system of claim 1, wherein when controlling each of the injectors to make the injectors individually inject fuel at different times, the controller controls a fuel injection section of each of the injectors to form a delay section, during which fuel injection is not performed, in an interval between the individual and simultaneous fuel injection sections of the injectors.

4. The control system of claim 1, wherein when controlling each of the injectors to make the injectors simultaneously inject fuel, the controller regulates a total fuel amount injected for one combustion cycle by regulating an amount of fuel injected by each of the injectors.

5. The control system of claim 1, wherein when controlling each of the injectors to make the injectors individually inject fuel at different times, the injectors are arranged on an intake port of the engine, and the controller makes the injectors perform a first fuel injection in a state in which an intake valve arranged in the combustion chamber is closed.

* * * * *